United States Patent [19]

Kojima et al.

[11] 4,376,371

[45] Mar. 15, 1983

[54] HYDRAULIC CIRCUIT FOR A HYDRAULICALLY DRIVEN VEHICLE

[75] Inventors: Yasuo Kojima, Yokohama; Koichi Morita, Isehara; Kenzo Hoashi, Yokohama; Taketo Aruga, Isehara, all of Japan

[73] Assignee: Kabushiki Kaisha Komatsu Seisakusho, Tokyo, Japan

[21] Appl. No.: 195,382

[22] Filed: Oct. 9, 1980

[30] Foreign Application Priority Data

Oct. 9, 1979 [JP] Japan .................. 54-139088

[51] Int. Cl.³ ............................ F15B 13/09
[52] U.S. Cl. ....................... 60/420; 60/464; 180/6.48
[58] Field of Search .......... 60/420, 464; 180/6.48

[56] References Cited

U.S. PATENT DOCUMENTS 4,248,573 2/1981 Uehara et al. .................. 60/486

FOREIGN PATENT DOCUMENTS

| 54-71258 | 7/1979 | Japan | 60/420 |
| 54-71259 | 7/1979 | Japan | 60/420 |
| 54-71260 | 7/1979 | Japan | 60/420 |
| 54-71261 | 7/1979 | Japan | 60/420 |
| 54-71262 | 7/1979 | Japan | 60/420 |
| 54-71263 | 7/1979 | Japan | 60/420 |
| 54-71264 | 7/1979 | Japan | 60/420 |

*Primary Examiner*—Gerald A. Michalsky
*Attorney, Agent, or Firm*—Armstrong, Nikaido, Marmelstein & Kubovcik

[57] ABSTRACT

A hydraulic circuit for a hydraulically driven vehicle comprising a pair of variable displacement hydraulic pumps, a pair of hydraulic motors each connected with the respective variable displacement pumps in a closed loop, and a straight run compensator valve connected between the respective closed loops for equalizing fluid pressure in both closed loops when the vehicle is set in a straight run thereby assuring a steady straight run of the vehicle irrespective of the difference in displacement of the respective variable displacement pumps.

3 Claims, 1 Drawing Figure

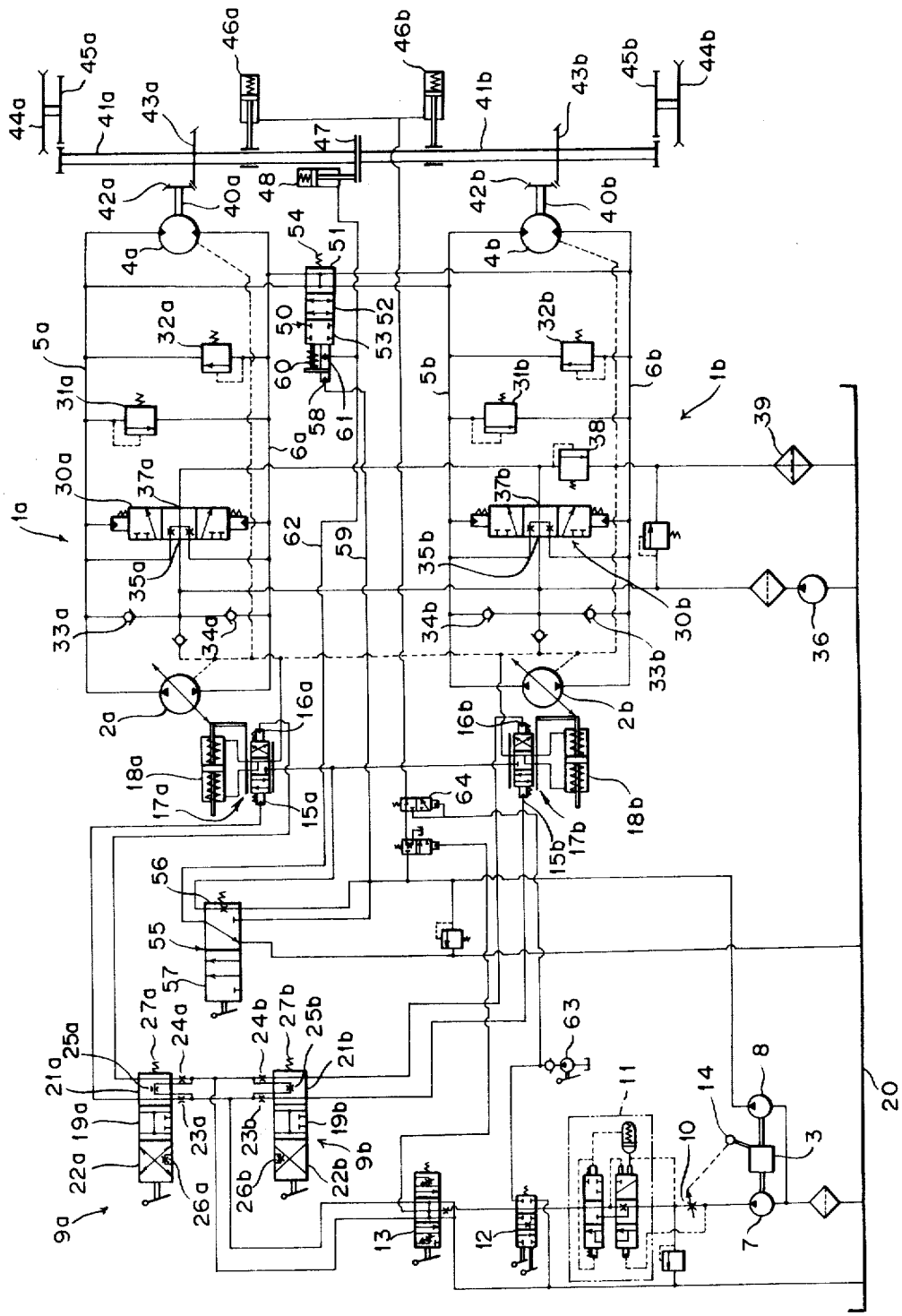

HYDRAULIC CIRCUIT FOR A HYDRAULICALLY DRIVEN VEHICLE

BACKGROUND OF THE INVENTION

This invention relates to a hydraulic circuit for a hydraulically driven vehicle and in particular to such a hydraulic circuit provided with a straight run compensator valve.

A hydraulically driven vehicle is generally provided with a pair of independent hydrostatic transmissions of a closed loop, each for driving one side of undercarriages. Each closed loop includes a variable displacement hydraulic pump driven by an engine and a hydraulic motor driven by the variable displacement hydraulic pump. Displacement volume of each variable displacement hydraulic pump is controlled by respective servo controls.

While a vehicle is running straight, theoretically both variable displacement hydraulic pumps deliver the same amount of fluid. However, this is not always true in practical sense and each variable displacement pump deliver a slightly different amount of fluid from each other resulting in different fluid pressure in respective closed loops. Besides, loads applied on respective undercarriages are different from each other causing a different fluid pressure in the respective closed loops. Accordingly, the vehicle is apt to turn right or left slightly even if it is set to run straight because respective hydraulic motors is rotated in different speed from each other in such occasions.

SUMMARY OF THE INVENTION

It is therefore an object of the present invention to provide a hydraulic circuit for a hydraulically driven vehicle which has overcome the above noted problems and provides an improved straight run capability of the vehicle.

Another object of the present invention is to provide a hydraulic circuit for a hydraulically driven vehicle which is provided with a straight run compensator valve to attain an improved straight run capability of the vehicle.

A further object of the present invention is to provide a hydraulic circuit for a hydraulically driven vehicle which is provided with a pair of steering valves having built-in orifices formed therein.

In accordance with an aspect of the present invention, there is provided a hydraulic circuit for a hydraulically driven vehicle, comprising: a pair of variable displacement hydraulic pumps each driven by a common engine; a pair of hydraulic motors each connected with said respective variable displacement hydraulic pumps in a closed loop and driven thereby, each closed loop comprising first and second conduits connected together; a pair of servo control means each for controlling the displacement of said respective variable displacement hydraulic pumps; a pair of steering valve means each for controlling said respective servo control means and hence steering of the vehicle and having formed therein a neutral position, a forward position and a reverse position and being normally held in the forward position; a straight run compensator valve means disposed between said pair of closed loops, said straight run compensator valve means having formed therein a neutral position where all of the first and second conduits of said closed loops are connected with each other, a communication position where the pair of first conduits of said closed loops are connectible with each other and the pair of second conduits of said closed loops are connectible with each other and a shut-off position where communication between said pair of closed loops is blocked; a selector valve means operatively linked with said steering valve means for controlling said straight run compensator valve means, said selector valve means having formed therein a first position and a second position and being held in said first position when both of said steering valve means remain their forward positions but changed over to said second position when one of said steering valve means is shifted to the neutral position or to the reverse position; and means for shifting said straight run compensator valve means to the communication position when said selector valve means is held in the first position and to the shut-off position when said selector valve means is shifted to the second position.

The above and other objects, features and advantages of the present invention will be readily apparent from following description taken in conjunction with accompanying drawing.

BRIEF DESCRIPTION OF THE DRAWINGS

Accompanying drawing is a hydraulic circuit for a hydraulically driven vehicle according to the present invention.

DESCRIPTION OF THE PREFERRED EMBODIMENT

The present invention will be described below in detail with reference to the accompanying drawing.

Generally designated by reference numeral $1a$ is a right hand side hydrostatic transmission and $1b$ a left hand side hydrostatic transmission, each independently drives one side of a vehicle's undercarriage. Since the vehicle's undercarriage and hydraulic circuit for driving and controlling thereof according to the present invention are generally symmetrical with respect to a longitudinal center line of a vehicle, the description herein mainly concentrates on the right hand side undercarriage and the circuit therefor for simplification.

For designating right hand side, reference character "a" is added to each reference numeral and "b" is added for indicating left hand side. The right hand side hydrostatic transmission $1a$ comprises a variable displacement hydraulic pump $2a$ driven by an engine 3 and a fixed displacement hydraulic motor $4a$ connected to the variable displacement pump $2a$ in a closed loop comprising conduits $5a$ and $6a$ and driven thereby. The engine 3 also drives a control pump 7 and a servo pump 8.

Hydraulic fluid delivered from the control pump 7 enters into right and left sides steering valves $9a$ and $9b$ after passing a variable orifice 10, an automatic speed change valve 11, an inching and brake valve 12, and a speed control valve 13. The variable orifice 10 is linked with a throttle lever 14 for the engine 3 and hence is changed simultaneously with the changing of the throttle lever 14. Since the above mentioned parts 10 to 13 are old in the art and constitute no part of the invention, detailed description thereof is omitted herein. Hydraulic fluid which passes through the steering valve $9a$ enters into pilot ports $15a$ and $16a$ of a servo control valve $17a$ for the variable displacement pump $2a$ and thereby to move or drive a servo cylinder $18a$. Since the variable displacement pump $2a$ is operatively coupled with the servo cylinder $18a$, movement of the servo cylinder 18a causes a change in displacement of the variable displacement pump 2a.

The steering valve 9a is manually operated and has a neutral position 19a in which both the pilot ports 15a and 16a are connected to a tank 20, a forward position 21a and a backward or reverse position 22a and is normally held in the forward position 21a by the action of a spring 27a. The steering valve 9a has orifices 23a and 24a formed at the inlet side thereof and also has built-in orifices 25a and 26a formed in the forward position 21a and the backward position 22a, respectively. The built-in orifice 25a or 26a functions to compensate steering interference and therefore a steering interference compensator valve employed usually in prior art devices is not required in the present invention.

Connected in parallel with the fixed displacement motor 4a in the closed loop are a shuttle valve 30a, relief valves 31a, 32a and check valves 33a, 34a.

The shuttle valve 30a has a port 35a connected to a charge pump 36 and a port 37a connected to the tank 20 through a relief valve 38 and a cooler 39.

An output shaft 40a of the motor 4a is operatively connected to a right hand side shaft 41a through gears 42a and 43a. The outer end of the shaft 41a is connected to a sprocket 44a for driving a right hand side undercarriage (not shown) through a final reduction gear 45a. Coupled with the shaft 41a is a brake 46a and a direct-coupling clutch 47 is provided between the right hand side shaft 41a and a left hand side shaft 41b for connecting both directly when engaged. The direct-coupling clutch 47 is operated by a hydraulic cylinder 48.

Provided between both closed loops of hydrostatic transmissions 1a and 1b is a straight run compensator valve 50 having formed therein a neutral position 51 in which all conduits 5a, 6a and 5b, 6b are connected with each other, a communication position or straight run position 52 in which higher pressure carrying conduits 5a and 5b are connected with each other and lower pressure carrying conduits 6a and 6b are connected with each other and a shut-off position or turning position 53 in which communication between both closed loops is blocked. The straight run compensator valve 50 is normally held at its neutral position 51 by the action of a spring 54.

A manually operated selector valve 55 is disposed in a circuit connecting the straight run compensator valve 50 and the servo pump 8. The selector valve 55 is linked with the steering valves 9a and 9b so that operation of either one of the steering valves 9a and 9b simultaneously operates the selector valve 55. The selector valve 55 has two positions, namely position 56 and position 57 and when both of the steering valves 9a and 9b remain in their forward positions 21a and 21b, the selector valve 55 occupies the position 56 while either one of the steering valves 9a and 9b is shifted to its neutral or backward position, the selector valve 55 occupies the position 57.

In operation, when the vehicle is running straight on by driving both undercarriages, the selector valve 55 is changed over to and held in the position 56.

Hydraulic fluid from the servo pump 8 enters into a pilot port 58 of the straight run compensator valve 50 through a conduit 59 and to change over the same to its communication position 52.

A spring 60 is provided to prevent the straight run compensator valve 50 from being shifted to its shut-off position 53 at this stage.

With the straight run compensator valve 50 being shifted to its communication position 52, the conduits 5a and 5b for carrying a higher fluid pressure are connected with each other and conduits 6a and 6b for carrying a lower fluid pressure are connected with each other thereby equalizing fluid pressure in both closed loops.

At the same time, since the selector valve 55 is shifted to the position 56, hydraulic fluid in the cylinder 48 of the direct-coupling clutch 47 is drained into the tank 20 through a conduit 62 thereby engaging the direct-coupling clutch 47 to directly couple the shafts 41a and 41b. Accordingly, since respective hydraulic motors 4a and 4b in the respective closed loops is rotated at the same speed each other irrespective of differences in the displacement of the variable displacement pumps 2a and 2b and loads applied on the respective undercarriage 1a and 1b, the steady straight run of the vehicle is assured.

When the driver wants to turn the vehicle to the right, the right side steering valve 9a is operated to shift the same to the neutral position 19a or to the reverse driving position 22a. With the shifting of the steering valve 9a to either neutral position 19a or reverse driving position 22a, the linked together selector valve 55 is simultaneously changed over to the position 57.

Therefore fluid pressure from the servo pumps 8 is introduced into not only the pilot port 58 but also another pilot port 61 of the straight run compensator valve 50 through the conduit 62 thereby shifting the straight run compensator valve 50 to the shut-off position 53. At the same time, fluid pressure from the servo pump 8 enters into the cylinder 48 through the conduit 62 thereby disengaging the direct-coupling clutch 47. With the straight run compensator valve 50 being shifted to the shut-off position 53, communication between both closed loops is blocked to separate the same from each other. As a result, the vehicle is allowed to make a right turn.

When the steering valve 9a is changed over to the neutral position 19a, the servo control valve 17a occupies its neutral center position since both pilot ports 15a and 16a of the servo control valve 17a are connected to the tank 20 through the speed control valve 13 irrespective of the position of the speed control valve 13. Therefore displacement of the variable displacement pump 2a becomes zero which permits a gradual right turn of the vehicle. When the steering valve 9a is further shifted to the reverse driving position 22a, the variable displacement pump 2a is rotated reversely to rotate the motor 4a reversely. As a result, the right side undercarriage 1a is driven reversely to effect a quick turn of the vehicle.

Since built-in orifices 25a and 26a are formed in the steering valves 9a, the operation of the right side steering valve 9a does not affect the left side steering valve 9b which also has built-in orifices 25b and 26b.

Besides, the steering compensator valve which would have been required in a prior art system, is not required in the present invention due to provision of the built-in orifices.

When the engine 3 is not in operation, the straight run compensator valve 50 is held in its neutral position 51 by the action of the spring 54 thereby to permits all the conduits 5a, 6a, 5b and 6b in the closed loops to communicate with each other.

Therefore since no pressure difference is developed in the inlet and outlet sides of the motors 4a and 4b, both motors are allowed to rotate freely in either direction. Accordingly, when it is wanted to draw the vehicle by another vehicle, a manually operated pump 63 is operated to supply fluid pressure therefrom into the brakes 46a and 46b to release the same through a traction valve 64 which is shifted to a communication position by the fluid pressure from the manually operated pump 63.

It is to be understood that the foregoing description is merely illustrative of a preferred embodiment of the invention, and that the scope of the invention is not to be limited thereto, but is to be determined by the scope of the appended claims.

What we claim is:

1. In a hydraulic circuit for a hydraulically driven vehicle including a pair of variable displacement hydraulic pumps each driven by a common engine, a pair of hydraulic motors each connected with said respective variable displacement hydraulic pumps in a closed loop and driven thereby, each closed loop comprising first and second conduits connected together, and a pair of servo control means each for controlling the displacement of said respective variable displacement hydraulic pumps, the improvement comprising:

a pair of steering valve means each for controlling said respective servo control means and hence steering of the vehicle and having formed therein a neutral position, a forward position and a reverse position and being normally held in the forward position;

a straight run compensator valve means disposed between said pair of closed loops, said straight run compensator valve means having formed therein a neutral position where all of the first and second conduits of said closed loops are connected with each other, a communication position where the pair of first conduits of said closed loops are connectible with each other and the pair of second conduits of said closed loops are connectible with each other and a shut-off position where communication between said pair of closed loops is blocked;

a selector valve means operatively linked with said steering valve means for controlling said straight run compensator valve means, said selector valve means having formed therein a first position and a second position and being held in said first position when both of said steering valve means remain their forward positions but changed over to said second position when one of said steering valve means is shifted to the neutral position or to the reverse position; and means for shifting said straight run compensator valve means to the communication position when said selector valve means is held in the first position and to the shut-off position when said selector valve means is shifted to the second position.

2. A hydraulic circuit for a hydraulically driven vehicle as recited in claim 1 further comprising a pair of shafts each driven by said respective hydraulic motors and having an outer end and an inner end, the outer end of which is connectible with an undercarriage of the vehicle for driving the same, and a direct-coupling clutch means for selectively coupling the inner ends of said shafts, said direct-coupling clutch means being engaged when said selector valve means is held in the first position and disengaged when said selector valve means is shifted to the second position.

3. A hydraulic circuit for a hydraulically driven vehicle as recited in claim 1 or 2 wherein each of said steering valve means has a first built-in orifice in the forward position and a second built-in orifice in the reverse position.

* * * * *